(12) United States Patent
Kakegawa et al.

(10) Patent No.: US 7,094,819 B2
(45) Date of Patent: Aug. 22, 2006

(54) FLAME-RETARDANT POLYTRIMETHYLENE TEREPHTHALATE RESIN COMPOSITION

(75) Inventors: Junko Kakegawa, Kawasaki (JP); Tomofumi Maekawa, Kawasaki (JP); Hideki Nakamura, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 62 days.

(21) Appl. No.: 10/485,958

(22) PCT Filed: Aug. 7, 2002

(86) PCT No.: PCT/JP02/08082

§ 371 (c)(1), (2), (4) Date: Feb. 6, 2004

(87) PCT Pub. No.: WO03/016402

PCT Pub. Date: Feb. 27, 2003

(65) Prior Publication Data

US 2004/0198878 A1    Oct. 7, 2004

(30) Foreign Application Priority Data

Aug. 9, 2001 (JP) .............................. 2001-241772
Aug. 31, 2001 (JP) .............................. 2001-264527
Jan. 31, 2002 (JP) .............................. 2002-024272

(51) Int. Cl.
C08K 3/32 (2006.01)
C08K 5/3492 (2006.01)
C08K 5/523 (2006.01)

(52) U.S. Cl. .............. 524/100; 524/127; 524/140; 524/141; 524/145; 524/416

(58) Field of Classification Search ........... 524/99–101, 524/116, 122, 126–127, 129, 140–141, 145, 524/138, 154, 416
See application file for complete search history.

(56) References Cited

U.S. PATENT DOCUMENTS 4,131,594 A    12/1978  Nakamura et al. .......... 524/371
6,071,612 A *   6/2000  Roderiguez et al. ........ 428/364
6,319,606 B1 * 11/2001  Best ........................... 428/395
6,458,455 B1 * 10/2002  Hernandez et al. ......... 428/359
6,503,969 B1 *  1/2003  Klatt et al. .................. 524/133
6,716,899 B1 *  4/2004  Klatt et al. .................. 524/133
6,790,886 B1 *  9/2004  Harashina et al. .......... 524/116
6,815,476 B1 * 11/2004  Bhatia et al. ................ 524/127

FOREIGN PATENT DOCUMENTS

| DE | 198 20 398 A1 | 11/1999 |
| DE | 198 20 399 A1 | 11/1999 |
| EP | 0 747 424 A1 | 12/1996 |
| EP | 0 945 478 A1 | 9/1999 |
| EP | 0 955 333 A2 | 11/1999 |
| EP | 0 955 338 A2 | 11/1999 |
| JP | 50-49361 A | 5/1975 |
| JP | 5-70671 A | 3/1993 |
| JP | 8-302124 A | 11/1996 |
| JP | 2000-169681 A | 6/2000 |
| JP | WO 01/48086 A1 | 7/2001 |
| WO | WO 01/48086 * | 7/2001 |

* cited by examiner

*Primary Examiner*—Peter Szekely
(74) *Attorney, Agent, or Firm*—Birch, Stewart, Kolasch & Birch, LLP

(57) ABSTRACT

A flame retardant polytrimethylene terephthalate resin composition, comprising:
  30 to 99 parts by weight of (A) a polytrimethylene terephthalate resin, and
  1 to 70 parts by weight of at least one flame retardant selected from the group consisting of (B-1) phosphorus-containing flame retardant and (B-2) nitrogen-containing flame retardant, is disclosed. The composition has superior mechanical characteristics, chemical resistance, electrical characteristics, weatherability, heat aging resistance and hydrolysis resistance, and has superior moldability, good appearance with less warpage deformation when molded, and furthermore has superior flame retardance and does not generate highly corrosive hydrogen halide gas upon combustion.

9 Claims, No Drawings

FLAME-RETARDANT POLYTRIMETHYLENE TEREPHTHALATE RESIN COMPOSITION

TECHNICAL FIELD

The present invention relates to a flame retardant polytrimethylene terephthalate resin composition. In more detail, the present invention relates to a flame retardant polytrimethylene terephthalate resin composition with superior moldability, less warpage deformation and a good appearance when molded, superior flame retardance and no generation of highly corrosive hydrogen halide gas upon combustion.

BACKGROUND ART

Thermoplastic polyesters represented by polyethylene terephthalate or polybutylene terephthalate are superior in mechanical characteristics, chemical resistance and electric characteristics, and thus are used in a wide variety of fields including automotive parts and electric/electronics parts. With the diversification of the markets in these fields, thermoplastic polyesters are required to have higher or special performance and a higher quality, depending on their applications. Polytrimethylene terephthalate resin, among other polyester resins, is superior in mechanical characteristics, weatherability, heat aging resistance and hydrolysis resistance. It also has superior properties such that when reinforced with inorganic fillers, the appearance of the molding is not impaired and warpage of the molding hardly occurs. Its uses can thus be extended to a wide variety of fields.

For the application with electric/electronics parts, which is one of the fields where the application of polytrimethylene terephthalate resin is expected to extend, a level of flame retardance based on the UL-94 standard by UNDERWRITERS LABORATORIES is required.

To satisfy this requirement, compositions containing halogen type flame retardants have conventionally been studied. For example, JP-A-50-49361 proposes a resin composition consisting of polypropylene terephthalate or polybutylene terephthalate, decabromodiphenyl ether, antimony trioxide and asbestos. U.S. Pat. No. 4,131,594 proposes a resin composition consisting of polytrimethylene terephthalate and a graft copolymer, a halogen type flame retardant, such as a polycarbonate oligomer of decabromobiphenyl ether or tetrabromobisphenol A, antimony oxide and glass fiber. However, such a halogen type flame retardant generates corrosive hydrogen halide upon combustion and also is suspected of discharging toxic substances such as dioxin. There is thus a movement to control the use of plastic products containing a halogen type flame retardant.

In this movement, JP-A-2000-169681, for example, proposes a flame retardant resin composition consisting of polytrimethylene terephthalate and red phosphorus. However, the use of this composition is limited because it has a red color and possibly generates phosphine gas during processing. Further, EP 0955338, EP 0955333 and JP 310284 propose resin compositions consisting of polybutylene terephthalate, melamine cyanurate, ammonium polyphosphate or melamine polyphosphate, phosphate ester and glass fiber. These compositions, however, have large warpage deformation and a poor appearance when molded, and thus cannot sufficiently satisfy the market's needs.

DISCLOSURE OF THE INVENTION

An object of the present invention is to provide a polytetramethylene terephthalate resin composition with superior mechanical characteristics, chemical resistance, electric characteristics, An object of the present invention is to provide a polytrimethylene terephthalate resin composition with superior mechanical characteristics, chemical resistance, electric characteristics, weatherability, heat aging resistance and hydrolysis resistance, as well as superior moldability, a good appearance with less warpage deformation when molded, superior flame retardance and no generation of highly corrosive hydrogen halide gas upon combustion, that sufficiently satisfies the market's requirements. weatherability, heat aging resistance and hydrolysis resistance, as well as superior moldability, a good appearance with less warpage deformation when molded, superior flame retardance and no generation of highly corrosive hydrogen halide gas upon combustion, that sufficiently satisfies the market's requirements.

The inventors found that a flame retardant resin composition with superior moldability, less warpage deformation and a good appearance when molded, superior flame retardance and no generation of highly corrosive hydrogen halide gas upon combustion, can be provided by a resin composition comprising a (A) polytrimethylene terephthalate resin and at least one flame retardant selected from a group consisting of (B-1) phosphorus-containing flame retardants and (B-2) nitrogen-containing flame retardants, and thus accomplished the present invention.

The aspects of the present invention thus relate to the following:

(1) A flame retardant polytrimethylene terephthalate resin composition, comprising:

30 to 99 parts by weight of (A) a polytrimethylene terephthalate resin, and 1 to 70 parts by weight of at least one flame retardant selected from the group consisting of (B-1) phosphorus-containing flame retardants and (B-2) nitrogen-containing flame retardants.

(2) The flame retardant polytrimethylene terephthalate resin composition in accordance with (1), wherein said (B-1) phosphorus-containing flame retardants are phosphate ester compounds or condensed phosphate ester compounds.

(3) The flame retardant polytrimethylene terephthalate resin composition in accordance with (2), wherein said (B-1) phosphorus-containing compounds are condensed phosphate ester compounds represented by general formula (1):

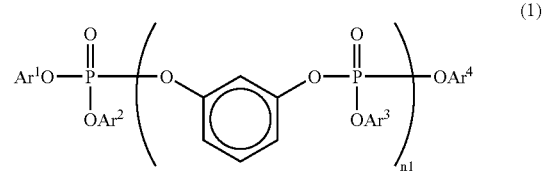

or by general formula (2):

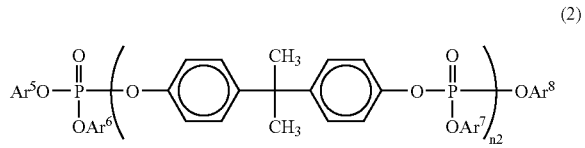

wherein, $Ar^1$ to $Ar^4$ and $Ar^5$ to $Ar^8$ may be the same or different and represent a phenyl group or a phenyl group substituted with an organic residual group(s) not containing halogen; and n1 and n2 represent number average degrees of polymerization.

(4) The flame retardant polytrimethylene terephthalate resin composition in accordance with (1), wherein said (B-1) phosphorus-containing flame retardants are phosphazene compounds comprising a repeating unit represented by general formula (3):

wherein Rs may be the same or different, and represent an alkyl group, aryl group, alkoxy group, aryloxy group, alkylamino group, arylamino group, hydroxyl group or amino group.

(5) The flame retardant polytrimethylene terephthalate resin composition in accordance with (4), wherein said (B-1) phosphorus-containing compounds are linear phosphazene compounds represented by general formula (4) and/or cyclic phosphazene compounds represented by general formula (5):

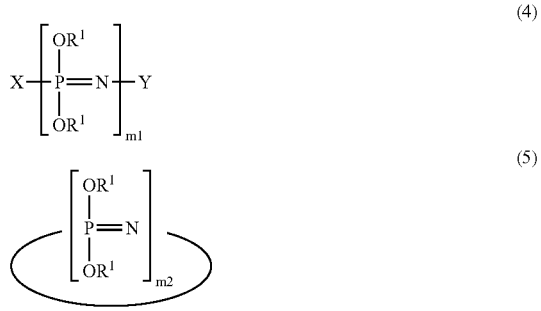

(in general formulae (4) and (5), m1 is an integer of 3 to 1,000; m2 is an integer of 3 to 25; $R^1$ and $R^2$ may be the same or different, and represent a phenyl group substituted with at least one group selected from the group consisting of alkyl groups and allyl groups having 1 to 6 carbon atoms, or a non-substituted phenyl group; X is —N=P(OR$^1$)$_3$ group or —N=P(O)OR$^1$ group; and Y is —P(OR$^1$)$_4$ group or —P(O)(OR$^1$)$_2$ group).

(6) The flame retardant polytrimethylene terephthalate resin composition in accordance with any one of (1) to (5), wherein said (B-2) nitrogen-containing flame retardants are melamine type compounds or salts of a melamine type compound and cyanuric acid or isocyanuric acid.

(7) The flame retardant polytrimethylene terephthalate resin composition in accordance with any one of (1) to (5), wherein said (B-2) nitrogen-containing flame retardants are selected from salts of phosphoric acid or a polyphosphoric acid and ammonia or melamine type compounds.

(8) The flame retardant polytrimethylene terephthalate resin composition in accordance with (7), wherein said (B-2) nitrogen-containing flame retardants are melamine polyphosphates.

(9) The flame retardant polytrimethylene terephthalate resin composition in accordance with (1), wherein said flame retardant comprises at least one of said (B-1) phosphorus-containing flame retardants and at least one of said (B-2) nitrogen-containing flame retardants.

(10) The flame retardant polytrimethylene terephthalate resin composition in accordance with (9), comprising:
30 to 99 parts by weight of said (A) polytrimethylene terephthalate resin, and
1 to 70 parts by weight of flame retardants, wherein said flame retardants consist of 3 to 75 parts by weight of at least one (B-1) phosphorus-containing flame retardant and 25 to 97 parts by weight of at least one (B-2) nitrogen-containing flame retardant, with respect to the total amount of said flame retardants.

(11) The flame retardant polytrimethylene terephthalate resin composition in accordance with (10), comprising:
30 to 98 parts by weight of said (A) polytrimethylene terephthalate resin,
1 to 25 parts by weight of at least one (B-1) phosphorus-containing flame retardant, and
1 to 45 parts by weight of at least one (B-2) nitrogen-containing flame retardant.

(12) The flame retardant polytrimethylene terephthalate resin composition in accordance with (1), further comprising 5 to 150 parts by weight of (C) an inorganic filler with respect to the total of 100 parts by weight of 30 to 99 parts by weight of said (A) polytrimethylene terephthalate resin and 1 to 70 parts by weight of said (B-1) phosphorus-containing flame retardant and/or said (B-2) nitrogen-containing flame retardant.

(13) The flame retardant polytrimethylene terephthalate resin composition in accordance with (12), wherein said (C) inorganic filler is glass fiber.

(14) A molding comprising the flame retardant polytrimethylene terephthalate resin composition in accordance with any one of (1) to (13).

(15) The molding in accordance with (14), which is an injection molded product.

BEST MODE FOR CARRYING OUT THE INVENTION

A flame retardant polytrimethylene terephthalate resin composition of the present invention will be described below in detail.

The polytrimethylene terephthalate (hereinafter abbreviated as "PTT") in the present invention is a polyester polymer using terephthalic acid as an acid component and trimethylene glycol as a glycol component.

Said trimethylene glycol is selected from 1,3-propanediol, 1,2-propanediol, 1,1-propanediol, 2,2-propanediol and a mixture thereof, and 1,3-propanediol is particularly preferable in view of the crystallization rate.

Further, the PTT in the present invention includes those obtained by copolymerization using other acid components than terephthalic acid, including an aromatic dicarboxylic acid such as phthalic acid, isophthalic acid, 2,6-naphthalenedicarboxylic acid, diphenylcarboxylic acid, diphenylether-dicarboxylic acid, diphenoxyethane-dicarboxylic acid, diphenylmethane-dicarboxylic acid, diphenylketone-dicarboxylic acid and diphenylsulfone-dicarboxylic acid; an aliphatic dicarboxylic acid such as succinic acid, adipic acid and sebacic acid; an alicyclic dicarboxylic acid such as cyclohexane-dicarboxylic acid; an oxydicarboxylic acid such as ε-oxycapronic acid, hydroxybenzoic acid and hydroxyethoxybenzoic acid; and other glycol components than trimethylene glycol such as ethylene glycol, tetramethylene glycol, pentamethylene glycol, hexamethylene glycol, octamethylene glycol, neopentyl glycol, cyclohexane-dimethanol, xylylene glycol, diethylene glycol, polyoxyalkylene glycol and hydroquinone, as long as the object of the present invention is met.

In said copolymerization, the amount of the acid component(s) other than terephthalic acid and/or the glycol component(s) other than trimethylene glycol are not particularly limited as long as the object of the present invention is not impaired, but are usually preferable to be 20% by mole or less of the total acid components and/or 20% by mole or less of the total glycol components, respectively.

Further, a branching component, for example, a tri- or tetra-functional acid capable of forming an ester, such as tricarballylic acid, trimesic acid and trimellitic acid or a tri- or tetra-functional alcohol capable of forming an ester such as glycerin, trimethylolpropane and pentaerythritol may be copolymerized to the above-described polyester components. In this case, the amount of said branching component is 1.0% by mole or less, preferably 0.5% by mole or less and more preferably 0.3% by mole or less, of the total acid components or the total glycol components. Furthermore, two or more kinds of these copolymer components may be used in combination to obtain the PTT.

The method for producing the PTT used in the present invention is not particularly limited, and can be, for example, in accordance with the methods described in JP-A-51-140992, JP-A-5-262862 and JP-A-8-311177.

One example is a method comprising reacting terephthalic acid or an ester forming derivative thereof (for example, a lower alkyl ester such as dimethylester and monomethylester) with trimethylene glycol or an ester forming derivative thereof under heating at a suitable temperature for a suitable period of time in the presence of a catalyst, and further polycondensing the resultant glycol ester of terephthalic acid at a suitable temperature for a suitable period of time in the presence of a catalyst to have a desired degree of polymerization.

The polymerization method is also not particularly limited and includes melt polymerization, interfacial polymerization, solution polymerization, mass polymerization, solid phase polymerization and a combined method thereof.

In the PTT used in the present invention, various additives may be copolymerized or mixed, if necessary, such as a heat stabilizer, a defoaming agent, a color adjustment agent, an antioxidant, a UV absorber, an infrared ray absorber, a nucleating agent, a fluorescent whitener and a delustering agent.

The limiting viscosity [η] of the PTT in the present invention is not particularly limited, but is preferably 0.50 or more, more preferably 0.60 or more and most preferably 0.70 or more, in view of mechanical characteristics and fatigue characteristics.

The limiting viscosity [η] can be determined using an Ostwald's viscometer at 35° C., by dissolving a resin in o-chlorophenol so that the solute (PTT component) concentration becomes 1.00 g/dl, measuring the specific viscosity, ηsp of the supernatant liquid after precipitating insoluble solids (such as inorganic filler), and calculating by the following equation:

$$[\eta] = 0.713 \times (\eta sp/C) + 0.1086$$

$C = 1.00$ g/dl

Next, (B-1) a phosphorus-containing flame retardant in the present invention includes phosphate ester compounds, condensed phosphate ester compounds, phosphazene compounds, phosphine compounds and phosphineoxide compounds.

A phosphate ester compound which can be used in the present invention includes trimethyl phosphate, triethyl phosphate, tributyl phosphate, trioctyl phosphate, triphenyl phosphate, tricresyl phosphate, trixylyl phosphate, cresyldiphenyl phosphate, xylyldiphenyl phosphate, tolyldixylyl phosphate, tris(nonylphenyl) phosphate, (2-ethylhexyl) diphenyl phosphate, resorcinoldiphenyl phosphate and hydroquinonediphenyl phosphate. Among them, aromatic phosphate ester compounds such as triphenyl phosphate, tricresyl phosphate and trixylyl phosphate are preferable.

A condensed phosphate ester compound includes resorcinol-bis(diphenyl phosphate), hydroquinone-bis(diphenyl phosphate), bisphenol-A-bis(diphenyl phosphate), bisphenol-S-bis(diphenyl phosphate), resorcinol-bis(dixylyl phosphate), hydroquinone-bis(dixylyl phosphate), bisphenol-A-bis(dixylenyl phosphate), resorcinol-bis(ditolyl phosphate) and bisphenol-A-bis(ditolyl phosphate).

Among these condensed phosphate ester compounds, particularly preferable compounds are those represented by general formula (1):

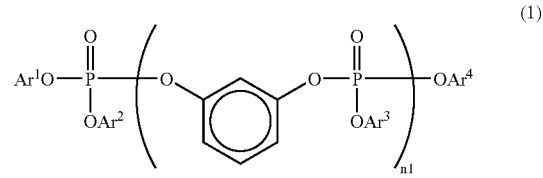

(1)

or by general formula (2):

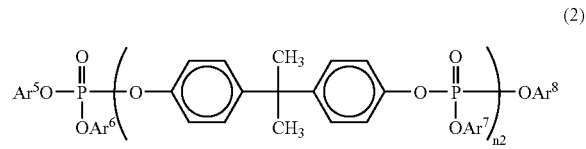

(2)

(in the general formulae (1) and (2), $Ar^1$ to $Ar^4$ and $Ar^5$ to $Ar^8$ may be the same or different, and represent a phenyl group or a phenyl group substituted with an organic residue(s) not containing halogen; n1 and n2 represent number average degrees of polymerization). As $Ar^1$ to $Ar^8$, a phenyl group, tolyl group and xylyl group are more preferably used and resorcinolbis(diphenyl phosphate), resorcinolbis(dixylyl phosphate), bisphenol-A-bis(diphenyl phosphate) and bisphenol-A-bis(dixylenyl phosphate) (all correspond to those when n1 and n2 are 1) are particularly preferable. The condensed phosphate ester is obtained industrially as a mixture of compounds having different degrees of polymerization, and each of n1 and n2 representing the number average degree of polymerization is preferably 0.5 to 5.

Further, as (B-1) a phosphorus-containing flame retardant in the present invention, a phosphazene compound having a repeating unit represented by general formula (3):

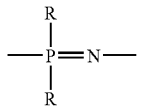
(3)

can be used. Here, R may be a functional group having any chemical structure except for a halogen-containing group. Specifically, R includes an alkyl group, an aryl group, an alkoxy group, an aryloxy group, an alkylamino group, an arylamino group, an hydroxyl group and an amino group. These functional groups can be used alone or in combination of two or more. The repeating unit represented by the above formula may be bonded in cyclic or linear form. A phosphazene compound consisting of the repeating unit represented by the above formula may be an oligomer or a polymer. For example, a phosphazene compound includes those described in James E. Mark, Harry R. Allcock, Robert West, "Inorganic Polymers" (Prentice-Hall International, Inc., 1992), p. 61–140.

More preferable phosphazene compounds include a linear and a cyclic phosphazene compound represented by the following general formula (4) or (5) and the same phosphazene compound crosslinked with a phenylene group, a biphenylene group or the like:

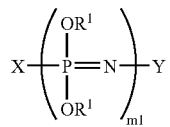
(4)

(wherein, m1 is an integer of 3 to 1,000; two $R^1$s may be the same or different, and represent a phenyl group substituted with at least one group selected from the group consisting of alkyl groups and allyl groups having 1 to 6 carbon atoms, or a non-substituted phenyl group; X is a —N=P(OR$^1$)$_3$ group or —N(O)OR$^1$ group; and Y is a —P(OR$^1$)$_4$ group or a —P(O)(OR$^1$)$_2$ group);

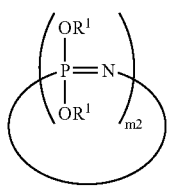
(5)

(wherein, m2 is an integer of 3 to 25; and $R^1$ is the same as defined above).

A phosphazene compound not containing a halogen atom can be used alone or in combination of two or more. A mixture of a cyclic phosphazene compound and a linear phosphazene compound may also be used.

Specific examples of a linear phosphazene compound represented by the above general formula (4) and a cyclic phosphazene compound represented by the above general formula (5) include, for example, phosphazene compounds of a mixture of cyclic and linear chlorophosphazene compounds, such as hexachlorocyclotriphosphazene and octachlorocyclotetraphosphazene obtained by reacting ammonium chloride with phosphorus pentachloride at about 120 to 130° C. and substituted with a phenoxy group(s) and/or an alkoxy group(s); and cyclic phosphazene compounds such as hexaphenoxycyclotriphosphazene, octaphenoxycyclotetraphosphazene, decaphenoxycyclopentaphosphazene, hexaalkoxycyclotriphosphazene, octaalkoxycyclotetraphosphazene and decaalkoxycyclopentaphosphazene obtained by isolating a single substance such as hexachlorocyclotriphosphazene, octachlorocyclotetraphosphazene and decachlorocyclopentaphosphazene from the above described mixture of chlorophosphazene compounds, then substituting with a phenoxy groups and/or an alkoxy group(s). In addition, linear phosphazene compounds are also included, which are obtained by ring opening polymerization of hexachlorocyclotriphosphazene under heating (220 to 250° C.) to prepare dichlorophosphazene and then substituting with a phenoxy groups and/or an alkoxy group(s).

Among these, linear phosphazene compounds represented by the above-described general formula (4) wherein m1 is an integer of 3 to 25 and cyclic phosphazene compounds represented by the above-described general formula (5) wherein m2 is an integer of 3 to 8, are particularly preferable.

The purity of the phosphazene compound depends on the raw materials, manufacturing method and manufacturing conditions thereof, but usually is about 98 to 99%. The purity of the phosphazene compound which can be used in the present invention is not particularly limited, but is 90% or more and, preferably, 95% or more. A purity in this range makes it possible to pulverize the compound simply and in a short time, thus providing a powder of phosphazene compound having a better powder state.

A phosphine compound which can be used in the present invention includes trilaurylphosphine, triphenylphosphine and tritolylphosphine.

A phosphineoxide compound includes triphenylphosphineoxide and tritolylphosphineoxide.

These phosphorus-containing flame retardants may be used alone or in combination of two or more.

Component (B-2), a nitrogen-containing flame retardant in the present invention, includes melamine type compounds, salts of cyanuric acid or isocyanuric acid and a melamine compound and a salt of phosphoric acid or polyphosphoric acid and a melamine compound.

A melamine type compound as used herein means melamine, a melamine derivative, a compound having a structure similar to melamine and a condensed compound of melamine, and specifically includes compounds having a triazine structure such as melamine, ammelide, ammeline, formoguanamine, guanylmelamine, cyanomelamine, benzoguanamine, acetoguanamine, succinoguanamine, melam, melem, methone and mellon; sulfate salts thereof; and a melamine resin. Melamine and melem are particularly preferable.

Cyanuric acid or isocyanuric acid is a compound represented by general formula (6):

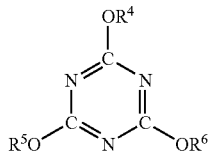

or general formula (7):

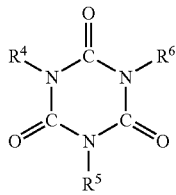

(wherein, $R^4$, $R^5$ and $R^6$ may be the same or different, and are a hydrogen atom or an alkyl group) (hereinafter, these compounds are called cyanuric acids or isocyanuric acids). A specific example of a compound represented by general formula (6) includes cyanuric acid, trimethyl cyanurate, triethyl cyanurate, tri(n-propyl) cyanurate, methyl cyanurate and diethyl cyanurate, and a specific example of a compound represented by general formula (7) includes isocyanuric acid, trimethyl isocyanurate, triethyl isocyanurate, tri(n-propyl) isocyanurate, diethyl isocyanurate and methyl isocyanurate.

A salt of cyanuric acid or isocyanuric acid and a melamine type compound which can be used in the present invention is an equimolar reaction product of the above-described cyanuric acid or isocyanuric acid with a melamine compound, which can be obtained as a white solid, for example, by mixing an aqueous solution of cyanuric acid and an aqueous solution of melamine, then reacting them at 90 to 100° C. under stirring followed by filtering the resulting precipitate. Some of the amino or hydroxyl groups in melamine cyanurate may be-substituted with other substituents. Among these salts of cyanuric acid or isocyanuric acid and a melamine compound, melamine cyanurate is most preferable.

Further, a salt of phosphoric acid or polyphosphoric acid and ammonia or a melamine compound, which can be used in the present invention as a nitrogen-containing flame retardant, includes ammonium phosphate, ammonium polyphosphate, melamine phosphate, melamine pyrophosphate and melamine polyphosphate.

For example, an industrially available ammonium polyphosphate includes "Taien S" (trade mark of a product from Taihei Chem. Ind. Co., Ltd.), obtained by treating ammonium polyphosphate with a melamine resin to make it hardly dissolvable in water, "Sumisafe P" and "Sumisafe PM" (trade marks of products from Sumitomo Chem. Ind. Co., Ltd.), "Exolit 462" (trade mark of a product from Hoechst AG) and "AMGARD MC" (trade mark of a product from Albright & Wilson) and the like.

Furthermore, "Exolit VP IFR-23" (trade mark of a product from Hoechst AG), "SPINFLAM MF80/PP", "SPINFLAM MF82/PP" and "SPINFLAM MF82/PS" (trade marks of products from Montecatini), which have been improved in flame retardation effect by using other auxiliary components in combination with ammonium polyphosphate, may be included.

Furthermore, a phosphoric acid comprising melamine phosphate specifically includes: orthophosphoric acid, phosphorous acid, hypophosphorous acid, metaphosphoric acid, pyrophosphoric acid, triphosphoric acid, and tetraphosphoric acid, and an adduct using orthophosphoric acid which is particularly preferable.

A polyphosphoric acid comprising melamine polyphosphate is generally called a condensed phosphoric acid, and includes a linear polyphosphoric acid and a cyclic polymetaphosphoric acid. Although the degree of condensation of these polyphosphoric acids is usually 3 to 50, this parameter is not particularly limited in the present invention.

A melamine polyphosphate which can be used in the present invention means a melamine adduct formed from substantially equimolar melamine and the above-described phosphoric acid, pyrophosphoric acid and polyphosphoric acid, and a part of the functional groups may be in a free state. Such melamine adduct is a powder obtained, for example, by thoroughly mixing a mixture of melamine and the above-described phosphoric acid as a slurry in water, then forming fine particles of the adduct of both components, followed by filtering the slurry, washing and drying, and then crushing the resulting solid. It is preferable to use a crushed powder of the melamine adduct having a particle diameter of 100 μm or less and preferably 50 μm or less. The use of the powder with a particle diameter of 0.5 to 20 μm is particularly preferable in view of not only the expression of high flame retardance but also the remarkably high strength of the molded articles.

These nitrogen-containing flame retardants may be used alone or in combination of two or more.

The content of each component in a flame retardant polytrimethylene terephthalate resin composition of the present invention is preferably in a range. of 30 to 99 parts by weight for (A) a polytrimethylene terephthalate resin and 1 to 70 parts by weight for at least one flame retardant selected from a group consisting of (B-1) phosphorus-containing flame retardants and (B-2) nitrogen-containing flame retardants. More preferable contents are 40 to 96 parts by weight for (A) a polytrimethylene terephthalate resin and 4 to 60 parts by weight for at least one flame retardant selected from a group consisting of (B-1) phosphorus-containing flame retardants and (B-2) nitrogen-containing flame retardants. If the content of (A) the polytrimethylene terephthalate resin is lower than 30 parts by weight, moldability and mechanical properties of molded articles will be impaired. If the content of at least one flame retardant selected from a group consisting of (B-1) phosphorus-containing flame retardants and (B-2) nitrogen-containing flame retardants is lower than 1 part by weight, the flame retardation effect will be insufficient. On the other hand, if the content is over 70 parts by weight, problems such as the generation of decomposition gas upon kneading and the adhesion of contaminants to a metal mold upon molding will occur, and further a remarkable lowering in mechanical properties or poor appearance of molded articles may occur.

Furthermore, in a flame retardant polytrimethylene terephthalate resin composition of the present invention, by using at least one (B-1) phosphorus-containing flame retardant and at least one (B-2) nitrogen-containing flame retardant together, as flame retardants, the flame retardation effect can be enhanced. In this case, a preferable content of each flame retardant with respect to the total amount of the flame retardants is 3 to 75 parts by weight for (B-1) a phosphorus-containing flame retardant(s) and 25 to 97 parts by weight for (B-2) a nitrogen-containing flame retardant(s). A further preferable ratio is 30 to 98 parts by weight for (A) polytrimethylene terephthalate resin, 1 to 25 parts by weight for at least one (B-1) phosphorus-containing flame retardant and 1 to 45 parts by weight for at least one (B-2) nitrogen-containing flame retardant.

Next, (C) an inorganic filler which can be used in the present invention will be described.

As an inorganic filler in the present invention, at least one inorganic filler selected from a group consisting of fibrous inorganic fillers, powdery inorganic fillers and plate-like inorganic fillers can be used, depending on the objective.

Fibrous inorganic fillers include glass fiber, carbon fiber, silica fiber, silica-alumina fiber, zirconia fiber, boron nitride fiber, silicone nitride fiber, boron fiber, potassium titanate whisker, wollastonite, and furthermore fiber-like substances of metals such as stainless steel, aluminum, titanium, copper and brass. An organic fibrous substance with a high melting point, such as a polyamide, fluorocarbon resin and acrylic resin may be used in combination with an inorganic filler(s).

Here, the average fiber length (hereinafter, also referred to as "L"), average fiber diameter (hereinafter, also referred to as "D") and aspect ratio (hereinafter, also referred to as "L/D") of the fibrous inorganic filler are not specifically limited. However, the average fiber length is preferably 50 μm or more in view of mechanical characteristics and fatigue characteristics, the average fiber diameter is preferably 5 μm or more and the aspect ratio is preferably 10 or more.

Further, with respect to carbon fiber, a carbon fiber having an average fiber length (L) of 100 to 750 μm, an average fiber diameter (D) of 3 to 30 μm and an aspect ratio (L/D) of 10 to 100 is preferably used. Furthermore, for wollastonite, a wollastonite having an average fiber length of 10 to 500 μm, an average fiber diameter of 3 to 30 μm and an aspect ratio (L/D) of 3 to 100 is preferably used.

Powdery inorganic fillers include carbon black, silica, quartz powder, glass beads, glass powder, silicates such as calcium silicate, aluminum silicate, kaolin, clay and diatomaceous earth; metal oxides such as iron oxide, titanium oxide, zinc oxide and alumina; metal carbonates such as calcium carbonate and magnesium carbonate; metal sulfates such as calcium sulfate and barium sulfate; silicone carbide; silicone nitride; boron nitride; and various metal powders. In this connection, with respect to talc, mica, kaolin, calcium carbonate and potassium titanate, those having an average particle diameter of 0.1 to 100 μm are most preferably used.

Plate-like inorganic fillers include talc, mica, glass flake, various metal foils and the like.

As an inorganic filler in the present invention, glass fiber is most preferably used in view of mechanical characteristics and fatigue characteristics. The glass fiber can be any glass fiber, as long as it can be usually compounded in a polyester resin, and its type and the like are not particularly limited.

Further, an inorganic filler may be used alone or in combination of two or more. The use of a glass fiber and an inorganic filler other than glass fiber together, in particular, the use of a glass fiber and a granular and/or plate-like inorganic filler together is preferable in view of providing mechanical strength, dimensional accuracy and desirable electrical properties.

The amount of (C) an inorganic filler to be blended is preferably in a range of 5 to 150 parts by weight with respect to the total of 100 parts by weight of 30 to 99 parts by weight of (A) a polytrimethylene terephthalate resin and 1 to 30 parts by weight of (B-1) a phosphorus-containing flame retardant(s) and/or (B-1) a nitrogen-containing flame retardant(s). More preferably, the amount of an (D) inorganic reinforcing filler is in a range of 10 to 120 parts by weight.

These inorganic fillers are preferably used, in particular, after being subjected to a surface treatment. The surface treatment is performed using a known coupling agent or a film-forming agent. The coupling agent preferably used includes a silane-based coupling agent and a titanium-based coupling agent. As a film-forming agent, an epoxy polymer, an urethane polymer, an acrylic acid-based polymer and a mixture thereof are preferably used.

To a flame retardant polytrimethylene terephthalate resin composition of the present invention, other components may be added in addition to the above-described polytrimethylene terephthalate resin, a flame retardant and an inorganic filler, if necessary, depending on various applications and the object.

By further blending a nucleating agent in a resin composition of the present invention, a composition with higher mechanical strength can be obtained. The nucleating agent may be a generally used known one, and may be of organic type or inorganic type.

By further blending a moldability improver in a resin composition of the present invention, a flame retardant resin composition with better moldability and better appearance when molded can be obtained. The moldability improver includes phosphate esters, phosphite esters, higher fatty acids, metal salts of higher fatty acids, esters of higher alcohols and higher fatty acids, higher fatty acid esters such as esters between polyhydric alcohols and higher fatty acids, higher fatty acid amide compounds, polyalkylene glycols or terminal-modified derivatives thereof, low molecular weight polyethylenes or oxidized low molecular weight polyethylenes, substituted benzylidenesorbitols, polysiloxanes and caprolactones. Particularly preferable moldability improvers are higher fatty acids, metal salts of higher fatty acids and higher fatty acid esters.

Further, to a resin composition of the present invention, additives usually used, such as a UV absorber, a heat stabilizer, an antioxidant, a plasticizer, a coloring agent and an impact strength improver can also be added, as long as the object of the present invention is met.

To a resin composition of the present invention, a thermoplastic resin may also be added as long as the object of the present invention is met. The thermoplastic resin includes polycarbonate, polyethylene terephthalate, polybutylene terephthalate and polystyrene type resin (rubber-reinforced polystyrene and an acrylonitrile-butadiene-styrene resin).

The method for producing a flame retardant polytrimethylene terephthalate resin composition of the present invention is not particularly limited, but includes a method of melt-kneading a mixture of a polytrimethylene terephthalate resin, a flame retardant(s) and, if necessary, an inorganic filler(s) and an additive(s), using a known melt-kneader, such as a single-screw or multi-screw extruder, kneader, mixing roll and Banbury mixer at a temperature of 200 to 400° C. In particular, melt-kneading with an extruder is simple and thus preferable.

A flame retardant polytrimethylene terephthalate resin composition of the present invention, as compared to conventional resin compositions, is superior in mechanical characteristics, chemical resistance, electrical characteristics, weatherability, heat aging resistance and hydrolysis resistance, and has superior moldability, good appearance and less warpage deformation when molded. Furthermore, it has superior flame retardance and does not generate highly corrosive hydrogen halide gas upon combustion. The composition, therefore, can be molded into various moldings, such as electric/electronic parts including a connector, coil bobbin, breaker, holder, plug and switch; automotive parts; and mechanical and structural parts by known molding methods, such as injection molding, extrusion molding, compression molding and blow molding, in particular, by injection molding.

EXAMPLES

The present invention will be described in more detail by way of Examples, however, the present invention is not limited by these Examples. The molding method and evaluation methods for various properties of the samples described in the Examples and Comparative Examples are as follows.

(Method for Molding Sample(s))

Samples were molded using an injection molding machine, "PS40E" from Nissei Plastic Co., Ltd., under conditions of a mold temperature of 95° C. and a cylinder temperature of 250° C. to obtain the moldings.

(Evaluation Methods for Various Characteristics)

(1) Limiting Viscosity [η] (Polytrimethylene Terephthalate Resin Composition)

A value of [η] (for a molding) was determined using the Ostwald's viscometer at 35° C. by dissolving the resin in o-chlorophenol with a purity of 98% or more so that the solute/solution concentration became 1.00 g/dl, followed by measuring the specific viscosity ηsp of the supernatant liquid therefrom and calculating in accordance with the following equation:

[η]=0.713×(ηsp/C)+0.1086

(providing C=1.00 g/dl).

(2) Flame Retardance

Measurement was performed using a test piece with a thickness of 1/16 inch, in accordance with UL-94V standard as specified by UNDERWRITERS LABORATORIES, U.S.A.

(3) Flexural Modulus (GPa)

It was measured in accordance with ASTM D790.

(4) Flexural Strength (MPa)

It was measured in accordance with ASTM D790.

(5) Warpage Deformation

An injection molded flat plate obtained by using a metal mold, with a thickness of 3 mm and a side length of 130 mm, was placed on a horizontal plane to measure the maximum gap width between the plate and the horizontal plane.

(6) Appearance of Molding

According to JIS-K7150, a value of Gs 60° C. was measured using a handy gloss meter "IG320" from Horiba Ltd. A sample with a measured value of 70 or more was evaluated as o, whereas a sample with a measured value of less than 70 was evaluated as x.

Materials used in the Examples and the Comparative Examples are Shown Below

Resins a-1: Polytrimethylene terephthalate resin, [η]=0.90 (PTT-1)
a-2: Polytrimethylene terephthalate resin, [η]=1.00 (PTT-2)
a-3: Polybutylene terephthalate resin (PBT), "Duranex 2002" (trade mark of a product from Polyplastics Co., Ltd.)
a-4: Polyethylene terephthalate resin (PET), "NEH-205" (trade mark of a product from Unitica Ltd.)

(B-1) Phosphorus-Containing Flame Retardants
b-1: Condensed phosphate ester compound:

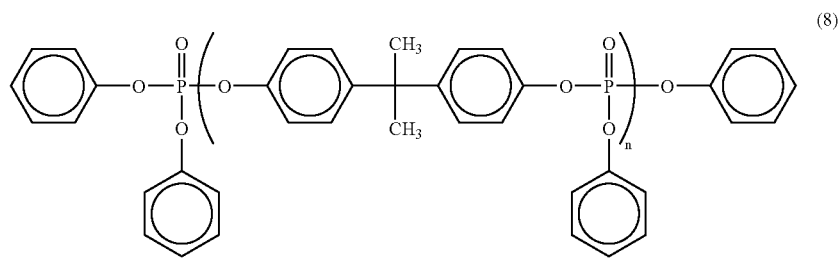

(8)

b-2: Condensed phosphate ester compound:

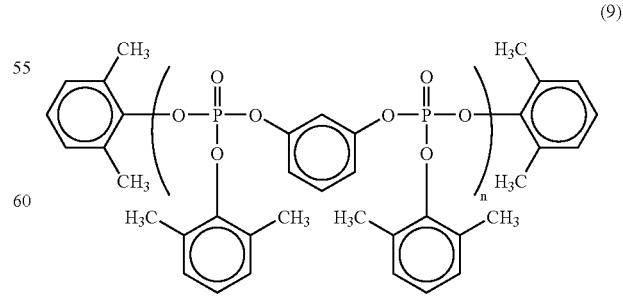

(9)

b-3: Phosphazene compound; phenoxyphosphazene represented by the following formula (10), "P-3800" (trade name of a product from Nippon Soda Co., Ltd.), a mixture of a compound with n=1 and a compound with n=2 (wherein, Ar represents a benzene ring).

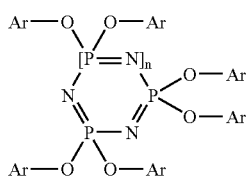

(B-1) Nitrogen-Containing Flame Retardants
b-4: melamine cyanurate (average particle diameter of 1.3 μm)
b-5: melem (average particle diameter of 1.8 μm)
b-6: melamine polyphosphate (average particle diameter of 3 μm)

(C) Inorganic Filler
c: glass fiber: "FT153" from Asahi Fiber Glass Co., Ltd.

Examples 1 to 9 and Comparative Examples 1 to 5

(A) a polytrimethylene terephthalate resin, a polybutylene terephthalate resin and a polyethylene terephthalate resin, (B-1) a phosphorus-containing flame retardant(s), (C) a nitrogen-containing flame retardant(s) and (D) an inorganic filler(s) are pre-mixed in the blend ratios shown in Table 1 with a blender, followed by melt kneading with a twin-screw extruder ("TEM35" from Toshiba Machinery CO., Ltd.) under the conditions of a predetermined cylinder temperature of 250° C. and a screw revolving speed of 200 rpm, taken out in the form of a strand and pelletized with a cutter to obtain pellets. Various properties of the pellets thus obtained were examined by the above-described measurement methods. The results are shown in Table 1. In Comparative Example 5 using polyethylene terephthalate (PET), problems in moldability, such as poor mold release occurred in the injection molding stage, which made the evaluation of the properties impossible.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Composition (parts by weight) | (a-1) | PTT Resin-1 |  |  | 40 |  | 45 |  | 35 | 40 |  |
|  | (a-2) | PTT Resin-2 | 50 | 55 |  | 35 |  | 40 |  |  | 65 |
|  | (a-3) | PBT Resin |  |  |  |  |  |  |  |  |  |
|  | (a-4) | PET Resin |  |  |  |  |  |  |  |  |  |
|  | (b-1) | Condensed phosphate ester | 20 |  |  | 15 | 10 |  |  | 5 | 15 |
|  | (b-2) | Condensed phosphate ester |  |  |  |  |  |  | 5 |  |  |
|  | (b-3) | Phosphazene compound |  | 15 |  |  |  | 15 |  |  |  |
|  | (b-4) | Melamine cyanurate |  |  |  | 20 |  |  | 30 |  |  |
|  | (b-5) | Melem |  |  |  |  |  | 15 |  |  |  |
|  | (b-6) | Melamine polyphosphate |  |  | 30 |  | 15 |  |  | 25 | 20 |
|  | (c-1) | Glass fiber | 30 | 30 | 30 | 30 | 30 | 30 | 30 | 30 | 0 |
| Evaluation | Flexural modulus | Gpa | 7.7 | 7.8 | 13.0 | 7.8 | 8.3 | 8.1 | 11.5 | 11.9 | 3.8 |
|  | Flexural strength | MPa | 170 | 175 | 120 | 130 | 150 | 135 | 175 | 180 | 110 |
|  | Warpage deformation | mm | 2 | 2 | 1 | 1 | 1 | 1 | 1 | 1 | 2 |
|  | Appearance of molding | Visual Examination | ○ | ○ | ○ | ○ | ○ | ○ | ○ | ○ | ○ |
|  | Flame retardance | UL-94 | V-2 | V-2 | V-1 | V-0 | V-0 | V-0 | V-0 | V-0 | V-2 |

|  |  |  | Comparative Example 1 | Comparative Example 2 | Comparative Example 3 | Comparative Example 4 | Comparative Example 5 |
|---|---|---|---|---|---|---|---|
| Composition (parts by weight) | (a-1) | PTT Resin-1 | 70 |  |  |  |  |
|  | (a-2) | PTT Resin-2 |  |  |  |  |  |
|  | (a-3) | PBT Resin |  | 50 | 40 | 35 |  |
|  | (a-4) | PET Resin |  |  |  |  | 35 |
|  | (b-1) | Condensed phosphate ester |  | 20 |  | 15 | 15 |
|  | (b-2) | Condensed phosphate ester |  |  |  |  |  |
|  | (b-3) | Phosphazene compound |  |  |  |  |  |
|  | (b-4) | Melamine cyanurate |  |  |  | 20 | 20 |
|  | (b-5) | Melem |  |  |  |  |  |
|  | (b-6) | Polyphosphoric acid-melamine adduct |  |  | 30 |  |  |
|  | (c-1) | Glass fiber | 30 | 30 | 30 | 30 | 30 |
| Evaluation | Flexural modulus | Gpa | 9.1 | 7.5 | 10.5 | 7.8 | Not moldable |
|  | Flexural strength | MPa | 206 | 175 | 120 | 120 | Not moldable |
|  | Warpage deformation | mm | 2 | 6 | 5 | 6 | Not moldable |

TABLE 1-continued

| | | | | | | |
|---|---|---|---|---|---|---|
| Appearance of molding | Visual Examination | ○ | X | X | X | Not moldable |
| Flame retardance | UL-94 | V-2 out | V-2 out | V-2 out | V-2 out | Not moldable |

INDUSTRIAL APPLICABILITY

A flame retardant polytrimethylene terephthalate resin composition of the present invention has superior mechanical characteristics, chemical resistance, electric characteristics, weatherability, heat aging resistance and hydrolysis resistance, as well as superior moldability and good appearance with less warpage deformation when molded, and furthermore has superior flame retardance and does not generate highly corrosive hydrogen halide gas upon combustion. Thus, the composition can be suitably used for electric/electronic parts such as a connector, a coil bobbin, a breaker, a holder, a plug and a switch; automotive parts; and mechanical and structural parts; and the like.

The invention claimed is:

1. A flame retardant polytrimethylene terephthalate resin composition, comprising:
   30 to 99 parts by weight of (A) a polytrimethylene terephthalate resin having a limiting viscosity [η] of 0.70 or more, and
   1 to 70 parts by weight of flame retardants comprising at least one of (B-1) phosphorus-containing flame retardants which are phosphate ester compounds or condensed phosphate ester compounds and at least one of (B-2) nitrogen-containing flame retardants selected from salts of i) phosphoric acid or a polyphosphoric acid with ii) ammonia or melamine compounds.

2. The flame retardant polytrimethylene terephthalate resin composition in accordance with claim 1, wherein said (B-1) phosphorus-containing compounds are condensed phosphate ester compounds represented by general formula (1):

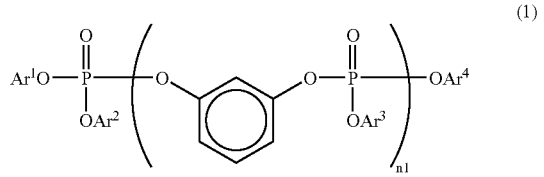

or by general formula (2):

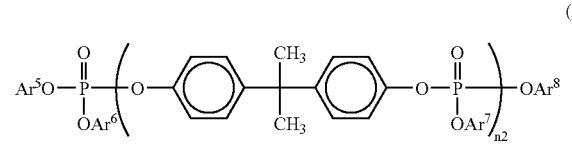

wherein $Ar^1$ to $Ar^4$ and $Ar^5$ to $Ar^8$ may be the same or different and represent a phenyl group or a phenyl group substituted with an organic residual group(s) not containing halogen; and n1 and n2 represent number average degrees of polymerization.

3. The flame retardant polytrimethylene terephthalate resin composition in accordance with claim 1, wherein said (B-2) nitrogen-containing flame retardants are melamine polyphosphates.

4. The flame retardant polytrimethylene terephthalate resin composition in accordance with claim 1, comprising:
   30 to 99 parts by weight of said (A) polytrimethylene terephthalate resin, and
   1 to 70 parts by weight of flame retardants,
      wherein said flame retardants consist of 3 to 75 parts by weight of said at least one (B-1) phosphorus-containing flame retardant and 25 to 97 parts by weight of said at least one (B-2) nitrogen-containing flame retardant, with respect to the total amount of said flame retardants.

5. The flame retardant polytrimethylene terephthalate resin composition in accordance with claim 1, comprising:
   30 to 98 parts by weight of said (A) polytrimethylene terephthalate resin,
   1 to 25 parts by weight of at least one of said (B-1) phosphorus-containing flame retardant, and
   1 to 45 parts by weight of at least one of said (B-2) nitrogen-containing flame retardant.

6. The flame retardant polytrimethylene terephthalate resin composition in accordance with claim 1, further comprising 5 to 150 parts by weight of (C) an inorganic filler with respect to the total of 100 parts by weight of 30 to 99 parts by weight of said (A) polytrimethylene terephthalate resin and 1 to 70 parts by weight of said flame retardants comprising at least one of said (B-1) phosphorus-containing flame retardant and at least one of said (B-2) nitrogen-containing flame retardant.

7. The flame retardant polytrimethylene terephthalate resin composition in accordance with claim 6, wherein said (C) inorganic filler is glass fiber.

8. A molding comprising the flame retardant polytrimethylene terephthalate resin composition in accordance with any one of claims 1, 2, 3, 4, 5, 6 and 7.

9. The molding in accordance with claim 8, which is an injection molded product.

* * * * *